United States Patent
Breslav

(10) Patent No.: US 11,163,993 B2
(45) Date of Patent: Nov. 2, 2021

(54) IMAGE ALIGNMENTS VIA OPTICAL CHARACTER RECOGNITION

(71) Applicant: Hewlett-Packard Development Company, L.P., Spring, TX (US)

(72) Inventor: Mikhail Breslav, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/614,517

(22) PCT Filed: Jul. 7, 2017

(86) PCT No.: PCT/US2017/041062
§ 371 (c)(1),
(2) Date: Nov. 18, 2019

(87) PCT Pub. No.: WO2019/009916
PCT Pub. Date: Jan. 10, 2019

(65) Prior Publication Data
US 2020/0184207 A1 Jun. 11, 2020

(51) Int. Cl.
*G06K 9/00* (2006.01)
*G06T 7/33* (2017.01)
*G06K 9/62* (2006.01)
*G06T 3/00* (2006.01)

(52) U.S. Cl.
CPC ....... *G06K 9/00442* (2013.01); *G06K 9/6215* (2013.01); *G06T 3/0068* (2013.01); *G06T 7/337* (2017.01); *G06K 2209/01* (2013.01)

(58) Field of Classification Search
CPC ............. G06K 9/00442; G06K 9/6215; G06K 2209/01; G06T 7/337; G06T 3/0068
See application file for complete search history.

(56) References Cited

U.S. PATENT DOCUMENTS

| 7,499,588 | B2 | 3/2009 | Jacobs et al. |
| 8,170,289 | B1 | 5/2012 | Feng et al. |
| 8,472,726 | B2 | 6/2013 | Gronau et al. |
| 8,472,727 | B2 | 6/2013 | Gronau et al. |

(Continued)

FOREIGN PATENT DOCUMENTS

| EP | 3223189 A1 * | 9/2017 | ........... G06K 9/6215 |
| WO | WO-9318483 | 9/1993 | |

OTHER PUBLICATIONS

Jarc, A. et al., "A Multistage Registration Method Using Texture Features", Jan. 29, 2009, 14 pages, https://www.ncbi.nlm.nih.gov/pmc/articles/PMC3046648/.

(Continued)

*Primary Examiner* — Ping Y Hsieh
*Assistant Examiner* — Xiao Liu
(74) *Attorney, Agent, or Firm* — Perry + Currier Inc

(57) ABSTRACT

An example apparatus including memory to store a first image of a document and a second image of the document, and a processor coupled to the memory, wherein the processor is to: perform optical character recognition on the first image to generate a first output dataset; perform optical character recognition on the second image to generate a second output dataset; and compute a transformation matrix based on the first output dataset and the second output dataset, the transformation matrix to align the first image with the second image.

10 Claims, 10 Drawing Sheets

(56) References Cited

U.S. PATENT DOCUMENTS

| | | |
|---|---|---|
| 9,292,739 B1 | 3/2016 | Gray et al. |
| 2006/0251338 A1* | 11/2006 | Gokturk ................ G06F 16/583 382/305 |
| 2009/0196510 A1 | 8/2009 | Gokturk et al. |
| 2012/0082372 A1 | 4/2012 | Mittal et al. |
| 2014/0192210 A1 | 7/2014 | Gervautz et al. |
| 2015/0169951 A1* | 6/2015 | Khintsitskiy ...... G06K 9/00483 382/182 |
| 2016/0328366 A1 | 11/2016 | Elarian |

OTHER PUBLICATIONS

"The Recursive Text Alignment Tool Version 1.1", 2013, 4 pages, http://ciir.cs.umass.edu/downloads/ocr-evaluation/.

* cited by examiner

IMAGE ALIGNMENTS VIA OPTICAL CHARACTER RECOGNITION

BACKGROUND

Printed documents are often used to present information. In particular, printed documents continue to be used despite the availability of electronic alternatives as they are more easily handled and read by users. As electronic alternatives to store the printed documents proliferate, storing documents as images is gaining in popularity.

In some instances, multiple images of the same document can be stored for a variety of reasons. Multiple images of the document are often captured using different settings of the image capturing device or under different views. For example, differing views of a document may result from moving the document relative to the camera or by moving the camera relative to the document.

BRIEF DESCRIPTION OF THE DRAWINGS

Reference will now be made, by way of example only, to the accompanying drawings in which.

DETAILED DESCRIPTION

Printed documents may be widely accepted, and may often be more convenient to use. In particular, printed documents are easy to distribute, store, and be used as a medium for disseminating information. For example, documents can include identification documents (such as driver's licenses and passports), which are typically printed and not typically available in electronic form. In other examples, printed documents may serve as contingency for electronically stored documents, such as may happen when an electronic device fails, such as with a poor data connection for downloading the document and/or a depleted power source. However, it may often be desired to convert printed documents into an electronic format for further analysis and/or storage.

Printed documents may be converted via an image capture process. For example, a camera may be used to take a photograph of the document. As another example, a scanner device may be used to capture the image of the document. When multiple images of the same document are taken, the individual images may be misaligned due to movement of the image capture device relative to the printed document between each image capture. The misalignment may occur when the second image is a translation, a rotation, a difference in zoom ratio, or a skew of the original image. The misalignments may be intentional, such as to establish multiple data points for evaluation of an optical character recognition engine. In other examples, the misalignments may be unintentional, such as small shifts in the relative position between the camera and the document between multiple images due to human error.

The alignment of multiple images may be desired to compare and/or combine images, such as for confirmation of authenticity of the document in the images. As another example, multiple images of multiple documents that are similar may also be desired for data input or data analysis. In particular, images of completed standard forms, such as an application, may be obtained for data entry purposes. In such cases, the location within the image of known fields may aid with data entry.

Figure 1:
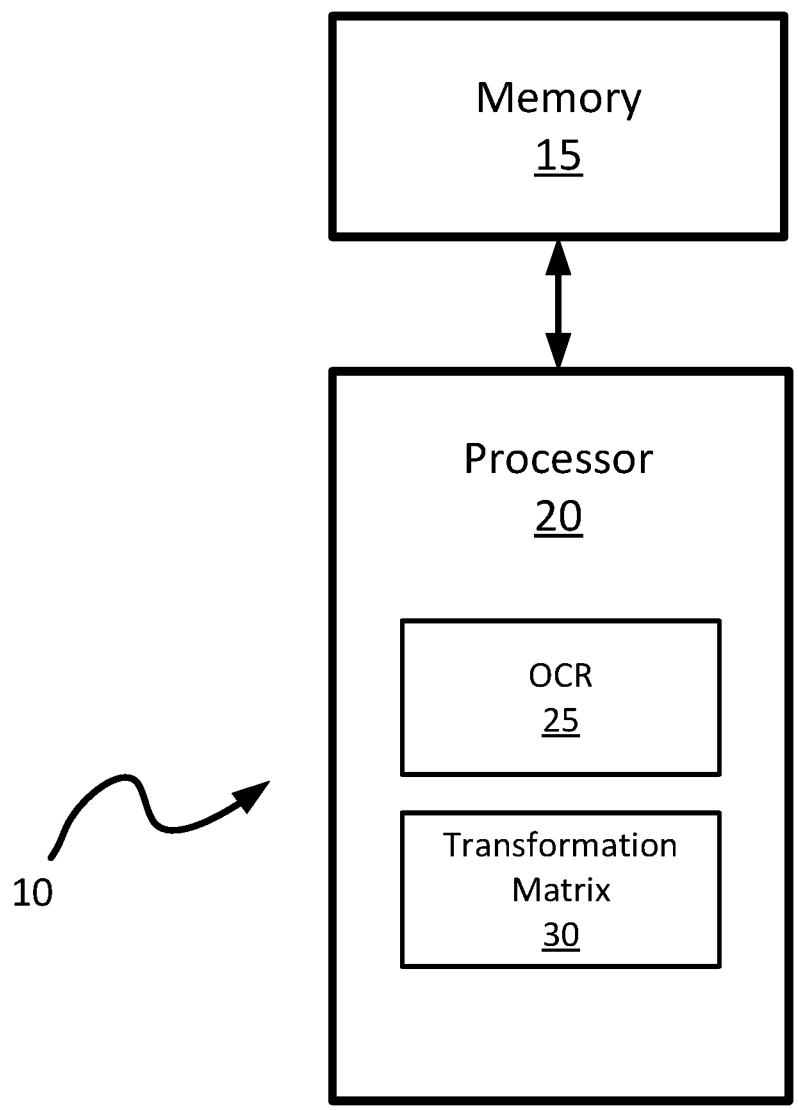
FIG. 1 is a block diagram of an example apparatus.

Referring to FIG. 1, an apparatus is shown at 10. For example, the apparatus 10 may include additional components, such as various interfaces and/or displays to receive from and to provide input to a user.

The apparatus 10 is to compute a transformation matrix that may be used to align multiple images together. For example, the apparatus 10 may receive multiple images via a communications interface, such as a network interface card, a communications port, or via an image capturing device. In the present example, the apparatus 10 includes a memory 15 and a processor 20. The processor may be to operate an optical character recognition (OCR) engine 25 as well as carry out a set of instructions 30 to calculate a transformation matrix, as discussed in greater detail below.

Figure 2:
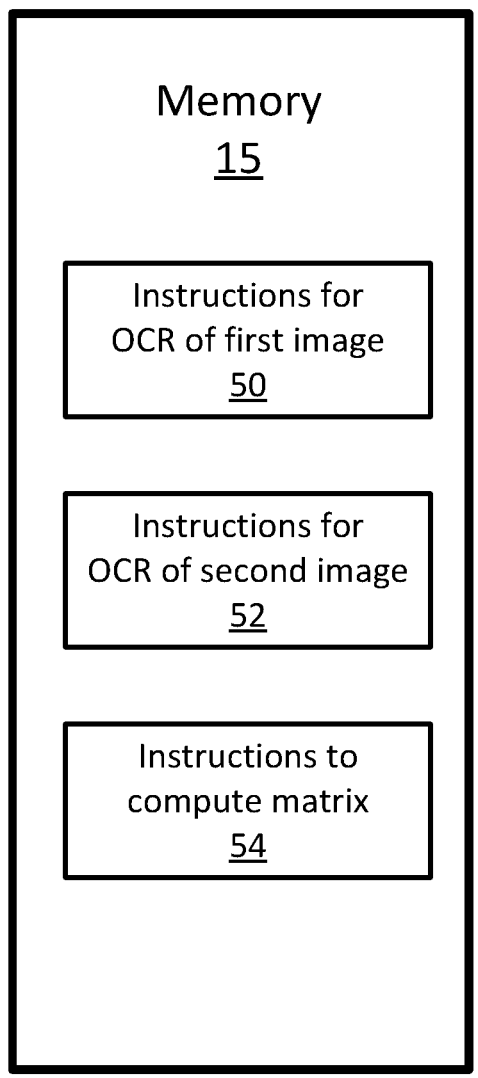
FIG. 2 is a block diagram of an example apparatus.

The memory 15 is coupled to the processor 20 and may include a non-transitory machine-readable storage medium that may be any electronic, magnetic, optical, or other physical storage device that stores executable instructions. For example, the memory 15 may include a first set of instructions 50 to generate a first plurality of characters from optical character recognition of a first image, a second set of instructions 52 to generate a second plurality of characters from optical character recognition of a second image, and a third set of instructions 54 to compute a transformation matrix from the first plurality of characters and the second plurality of characters as shown in FIG. 2. The non-transitory machine-readable storage medium may include, for example, random access memory (RAM), electrically erasable programmable read-only memory (EEPROM), flash memory, a storage drive, an optical disc, and the like. The machine-readable storage medium may be encoded with executable instructions to initiate the printing of electronic messages. In addition, the machine-readable storage medium may also be encoded with data such as the images of the documents as well as output datasets from the optical character recognition (OCR) engine 25.

The memory 15 may also store an operating system that is executable by the processor 20 to provide general functionality to the apparatus 10, including functionality to support applications the optical character recognition (OCR) engine 25 and the set of instructions 30 to calculate a transformation matrix. Examples of operating systems include Windows™, macOS™, iOS™, Android™, Linux™, and Unix™. The memory 15 may additionally store applications that are executable by the processor 20 to provide specific functionality to the apparatus 10, such as functionality to maintain a plurality of images of printed documents.

The processor 20 may include a central processing units (CPU), a microcontroller, a microprocessor, a processing core, a field-programmable gate array (FPGA), or similar. The processor 20 and memory 15 may cooperate to execute instructions. For example, the optical character recognition (OCR) engine 25 may be carried out by the processor 20 using instructions stored on the memory 15. In other examples, the optical character recognition (OCR) engine 25 may be substituted with an external engine, such as from a software as a service provider.

Figure 3:
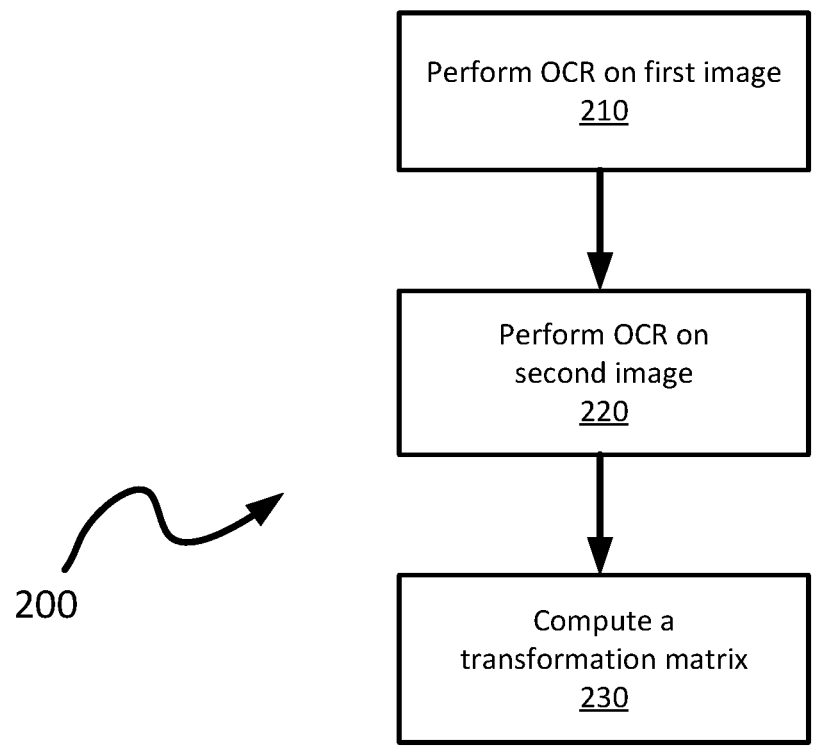
FIG. 3 is a flowchart of an example of a method.

Referring to FIG. 3, a flowchart of a method of generating a transformation matrix is shown at 200. In order to assist in the explanation of method 200, it will be assumed that method 200 may be performed with the apparatus 10, and specifically by the processor 20. Indeed, the method 200 may be one way in which apparatus 10 may be configured. Furthermore, the following discussion of method 200 may lead to a further understanding of the processor 20, and apparatus 10 and its various components. Furthermore, it is to be emphasized, that method 200 need not be performed in the exact sequence as shown, and various blocks may be performed in parallel rather than in sequence, or in a different sequence altogether.

Prior to the commencement of the method 200, two images of the same document are provided in the present example. As mentioned before, other examples may use images of similar documents instead of the same document. In the present example, the images are stored on the memory 15. The manner by which the images are loaded in to the memory 15 is not particularly limited. For example, the images may be captured with an optional image capture device connected to the memory 15. As another example, the images may be transferred to the memory 15 via an optional communications interface over a network, such as the Internet, or transferred manually using a portable computer readable storage medium, such as an optical disc or a flash drive.

Beginning at block 210, an optical character recognition operation may be carried out on a first image of a printed document to generate a first output dataset. The manner by which the optical character recognition operation may be carried out is not particularly limited. In the present example, the processor 20 may apply the optical character recognition (OCR) engine 25 to the first image.

Block 220 involves carrying out an optical character recognition operation on a second image of the same printed document to generate a second output dataset. Similar to the execution of block 210, the manner by which the optical character recognition operation is carried out is not particularly limited. In the present example, the processor 20 also applies the optical character recognition (OCR) engine 25 to the second image.

Next, at block 230, the processor 20 computes a transformation matrix based on the output datasets generated from the execution of block 210 and block 220. In the present example, the processor 20 may compute an affine transformation matrix using that would align the first image with the second image based on the output datasets generated from the optical character recognition (OCR) engine 25. The affine transformations may be applied to the output datasets is not particularly limited and may include translation, scaling, homothetic transformation, similarity transformation, reflection, rotation, shear mapping, and combinations of any of the above. In other examples, a general homography matrix may be computed to address other types of transformations.

The application of the method 200 to each combination of images stored in the memory 15 may result in a unique transformation matrix. Accordingly, it may be desirable to define a reference image to which all other images of the printed document are to be aligned. In the present example, the reference image may be an image associated with the ground truth text. The ground truth is technically not a result of an optical character recognition algorithm, but instead an output dataset representing the actual characters of the printed documents. The manner by which the ground truth is generated is not particularly limited, but in the present example, the ground truth is generated by the OCR engine 25 via manual data entry by a user.

Figure 4:
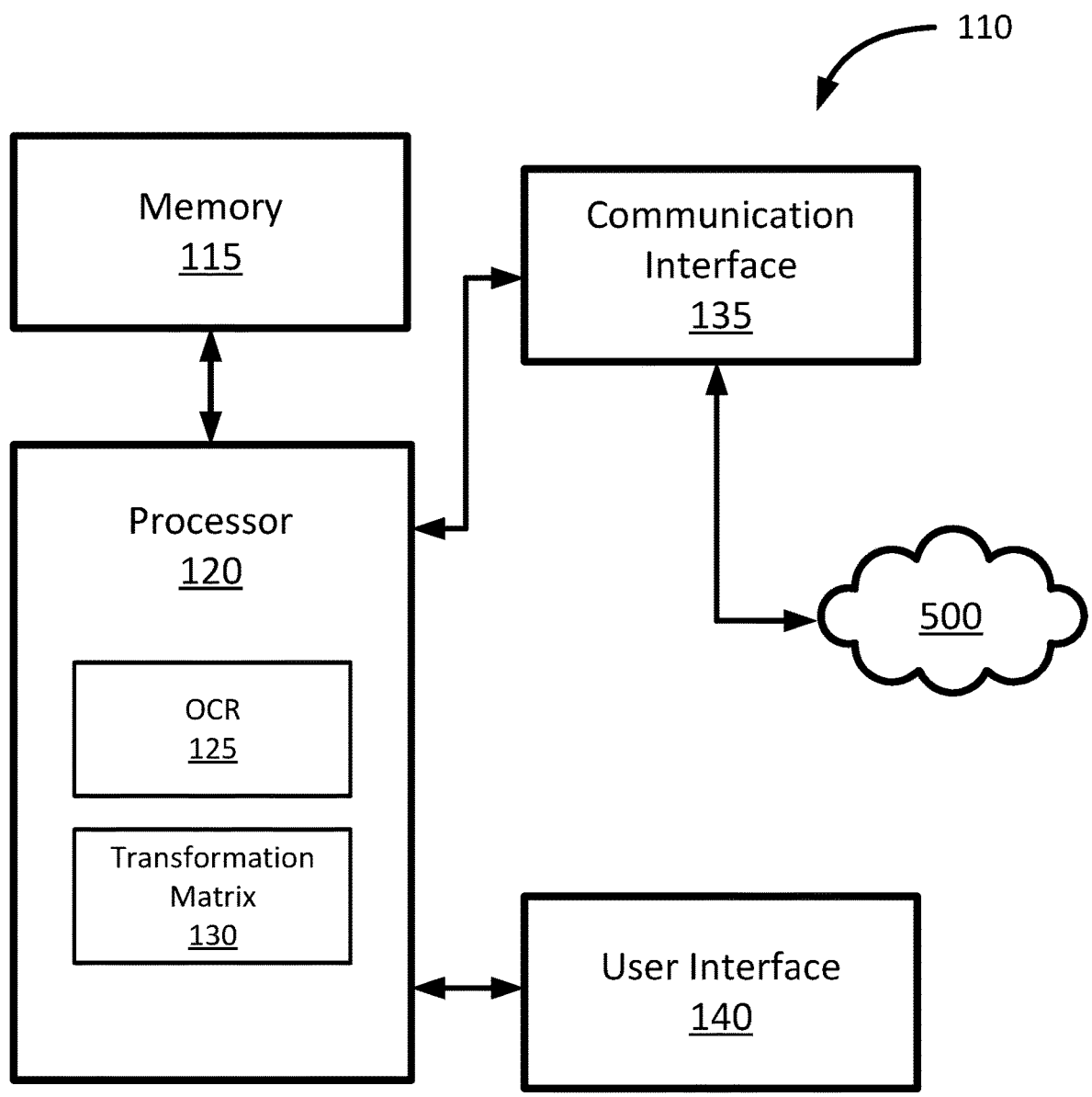
FIG. 4 is a block diagram of another example apparatus.

Referring to FIG. 4, another apparatus is shown at 110. The apparatus 110 is another example that can be used to carry out the method 200.

The apparatus 110 is to compute a transformation matrix and apply the transformation matrix to align characters generated by an OCR engine 125 of an image to characters generated by an OCR engine 125 of another image. For example, the apparatus 110 may receive multiple images via a communications interface 135, such as a network interface card, or via an image capturing device. In the present example, the apparatus 110 includes a memory 115, a processor 120, a communications interface 135, and a user interface device 140. The processor 120 may be to operate an optical character recognition (OCR) engine 125 as well as carry out a set of instructions 130 to calculate a transformation matrix, as discussed in greater detail below.

The memory 115 is coupled to the processor 120 and may include a non-transitory machine-readable storage medium that may be any electronic, magnetic, optical, or other physical storage device that stores executable instructions. The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions for initiating the printing of electronic messages. In addition, the machine-readable storage medium may also be encoded with data such as the images of the documents as well as output datasets from the optical character recognition (OCR) engine 125.

The memory 115 may also store an operating system that is executable by the processor 120 to provide general functionality to the apparatus 110, including functionality to support applications the optical character recognition (OCR) engine 125 and the set of instructions 30 to calculate a transformation matrix. Examples of operating systems include Windows™, macOS™, iOS™, Android™, Linux™, and Unix™. The memory 115 may additionally store applications that are executable by the processor 120 to provide specific functionality to the apparatus 110, such as functionality to maintain a plurality of images of printed documents.

The processor 120 may include a central processing units (CPU), a microcontroller, a microprocessor, a processing core, a field-programmable gate array (FPGA), or similar. The processor 120 and memory 115 cooperate to execute instructions. For example, the optical character recognition (OCR) engine 125 may be carried out by the processor 120 using instructions stored on the memory 115. In other examples, the optical character recognition (OCR) engine 125 may be substituted with an external engine, such as from a software as a service provider.

The communications interface 135 is coupled to the processor 120 and allows the processor 120 to communicate with a network 500. The network 500 may provide a link to another device, or content provider, such as a cloud network drive storing images of the document. The communications interface 135 may include a universal serial bus (USB) port, a serial port, a parallel port, a wired network adaptor, a wireless network adaptor, or similar.

The user interface 140 may include one or more user interface devices, such as a display device, a touchscreen, a keyboard, a mouse, a button, a speaker, a microphone, or similar. The user interface 140 may be coupled to the processor 120 to present information to a user in human-perceptible form, such as by rendering a graphical user interface (GUI). The user interface 140 may receive input from a user through the GUI and provide such user input to the processor 120. For example, the GUI may allow a user to enter the ground truth dataset of an image of a printed document. The instructions carried out by the processor 120 to allow entry of a ground truth dataset is not particularly limited and may be part of the OCR engine 125 or provided by a separate module.

Referring to FIGS. 5 to 8, the execution of the method 200 by the apparatus 10 or 110 is illustrated using a specific example.

Figure 5:
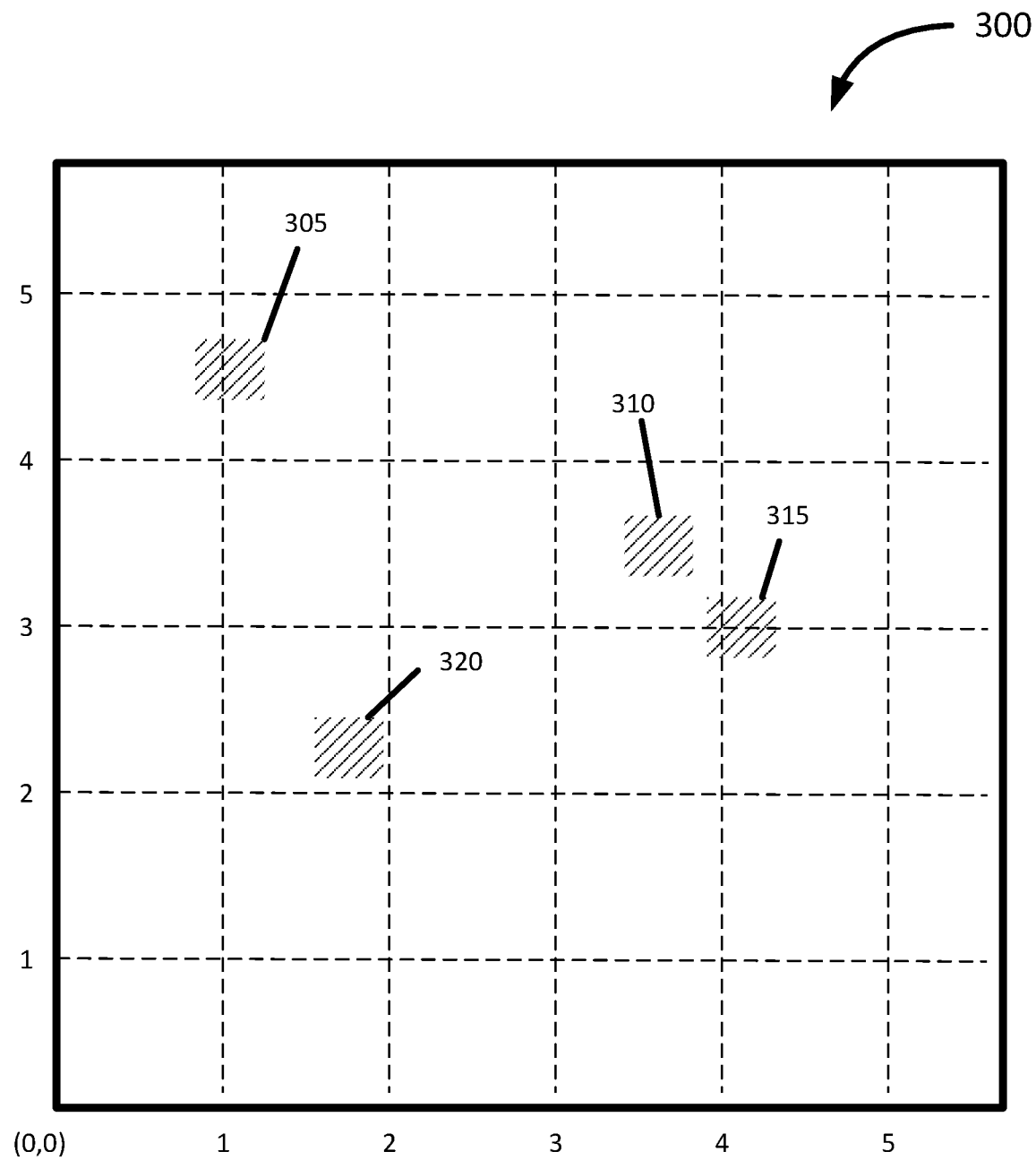
FIG. 5 is an example of an image of a document.

FIG. 5 shows a raw image 300 of a printed document. The image 300 includes a first feature 305, a second feature 310, a third feature 315, and a fourth feature 320. The image 300 may also be assigned a non-limiting coordinate system. For example, the coordinate system may correspond to the number of pixels along the edge of the image 300. In the present example, the coordinate system may be a Cartesian coordinate system where the values are arbitrarily assigned across the image.

The feature 305 appears at a position approximately (1.10,4.60) on the assigned coordinate system. The definition of the position of the feature 305 is not particularly limited and the position may be defined to be the center of the feature 305 or a corner of the feature 305. In the present example, the feature 305 represents a character of the Roman alphabet. The feature 305 is not limited to the Roman alphabet, and may include to other types of character such as Arab, Persian, or Cyrillic scripts. The feature 305 may also represent a word for languages that use logograms such as Chinese, Japanese, and Korean.

The feature 310 appears at a position approximately (3.60,3.50) on the assigned coordinate system. The feature 310 may have similar characteristics as the feature 305. In particular, the feature 310 may represent a character of the Roman alphabet. The feature 310 may also represent a different character from the feature 305.

The feature 315 appears at a position approximately (4.15,3.00) on the assigned coordinate system. The feature 315 may have similar characteristics as the feature 305 and the feature 310. In particular, the feature 315 may represent a character of the Roman alphabet. The feature 315 may also represent a different character from the feature 305 and/or the feature 310.

The feature 320 appears at a position approximately (1.75,2.30) on the assigned coordinate system. The feature 320 may have similar characteristics as the feature 305, the feature 310, and the feature 315. In particular, the feature 320 may represent a character of the Roman alphabet. The feature 320 may also represent a different character from the feature 305, the feature 310, and/or the feature 315.

The number of features is not particularly limited to the number shown in the present example. In FIG. 5, four features are shown to illustrate the method 200, the number of features is not limited. The image 300 may include more or less features depending on the nature of the document. For example, many documents may be a page of text having up to 3000 characters. Alternatively, the image 300 may include fewer features for images which are not predominately text.

Figure 6:
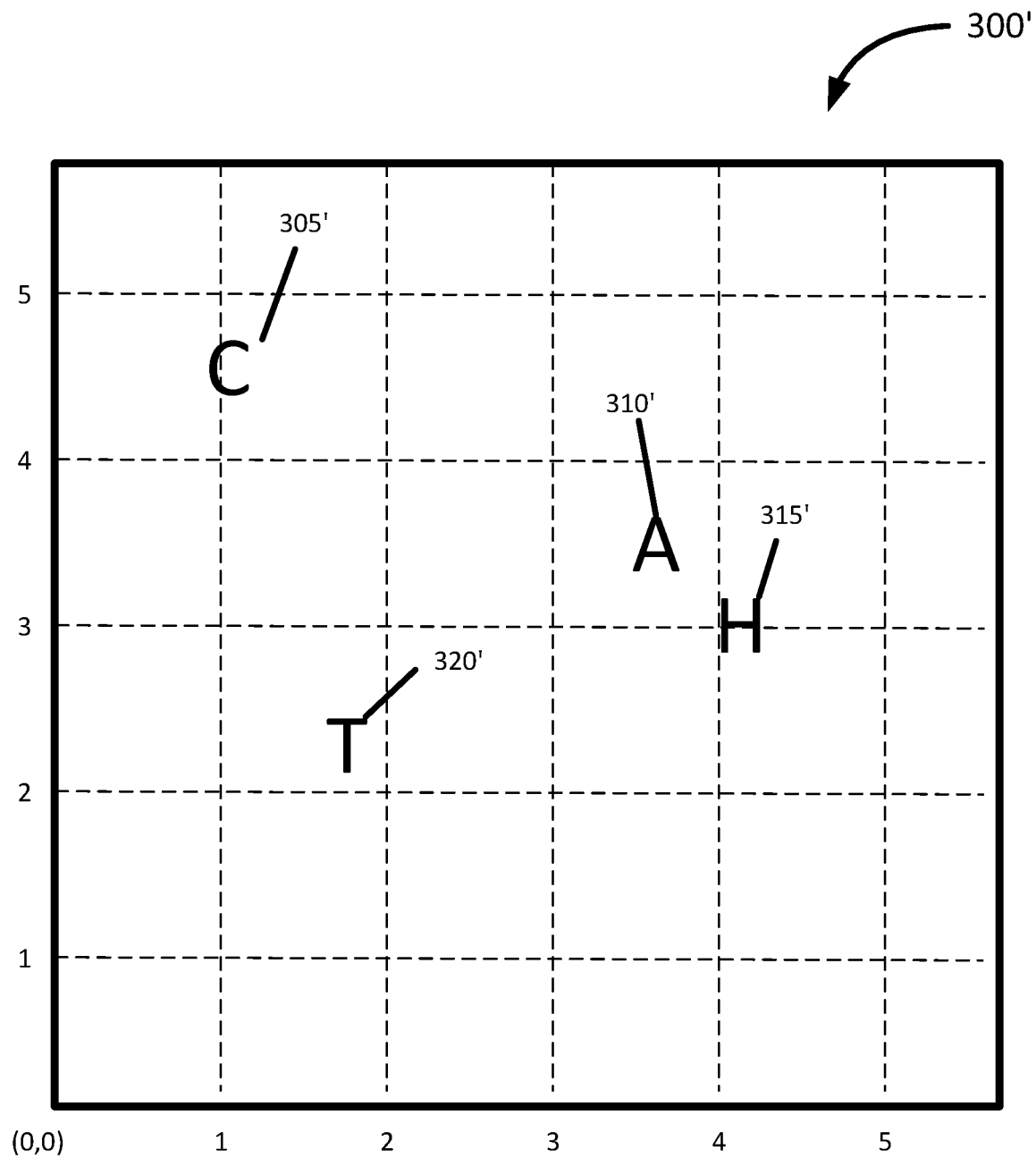
FIG. 6 is an example of the output from the OCR engine applied to the document of FIG. 3.

Continuing with the present example, FIG. 6 shows a processed image 300' of the image 300. In the present example, the image 300 was processed by the OCR engine 25 or the OCR engine 125 to generate the image 300' with embedded text where the first feature 305, the second feature 310, the third feature 315, and the fourth feature 320 were. In this example, the first feature 305 is associated with the character 305'; the second feature 310 is associated with the character 310'; the third feature 315 is associated with the character 315'; and the forth feature 320 is associated with the character 320'. The image 300' is also assigned the same coordinate system as in the image 300. In the present example, the coordinate system is a Cartesian coordinate system where the values are arbitrarily assigned across the image.

The character 305' appears at a position approximately (1.10,4.60) on the assigned coordinate system, which is the same as the position of the original raw feature 305. In the present example, the character 305' is "C". The manner by which the character 305' was determined is not particularly limited. In the present example, OCR engine 125 was applied to the image 300. In particular, OCR engine 125 was used to establish a ground truth of the document. Accordingly, the OCR engine 125 received user input via the user interface 140 to indicate the feature 305 is the character "C". Although the present example receives user input to establish a ground truth, other examples may apply an OCR algorithm to the image 300 to generate the character 305'.

The character 310' appears at a position approximately (3.60,3.50) on the assigned coordinate system, which is the same as the position of the original raw feature 310. In the present example, the character 310' is "A". The character 310' is obtained in a similar manner as the character 305' via the user interface 140.

The character 315' appears at a position approximately (4.15,3.00) on the assigned coordinate system, which is the same as the position of the original raw feature 315. In the present example, the character 315' is "H". The character 315' is obtained in a similar manner as the character 305' and the character 310' via the user interface 140.

The character 320' appears at a position approximately (1.75,2.30) on the assigned coordinate system, which is the same as the position of the original raw feature 320. In the present example, the character 320' is "T". The character 320' is obtained in a similar manner as the character 305', the character 310', and the character 315' via the user interface 140.

In the present example, the character 305', the character 310', the character 315', and the character 320' along with their positions form an output dataset associated with the image 300. The manner by which the character 305', the character 310', the character 315', and the character 320' are obtained is not particularly limited. Although the present example describes the OCR engine 125 receiving user input via the user interface 140 to establish the ground truth, other examples may bypass the OCR engine 125 and generate the ground truth. The character 305', the character 310', the character 315', and the character 320' need not all be obtained using the same method. For example, some of the characters may be obtained from user input while other may be obtained via the application of an OCR algorithm by the OCR engine 125. In such examples, the OCR algorithm may be applied and evaluated for quality such that if the quality standard falls below a threshold, the OCR engine 125 may prompt a user for manual input via the user interface 140.

Figure 7:
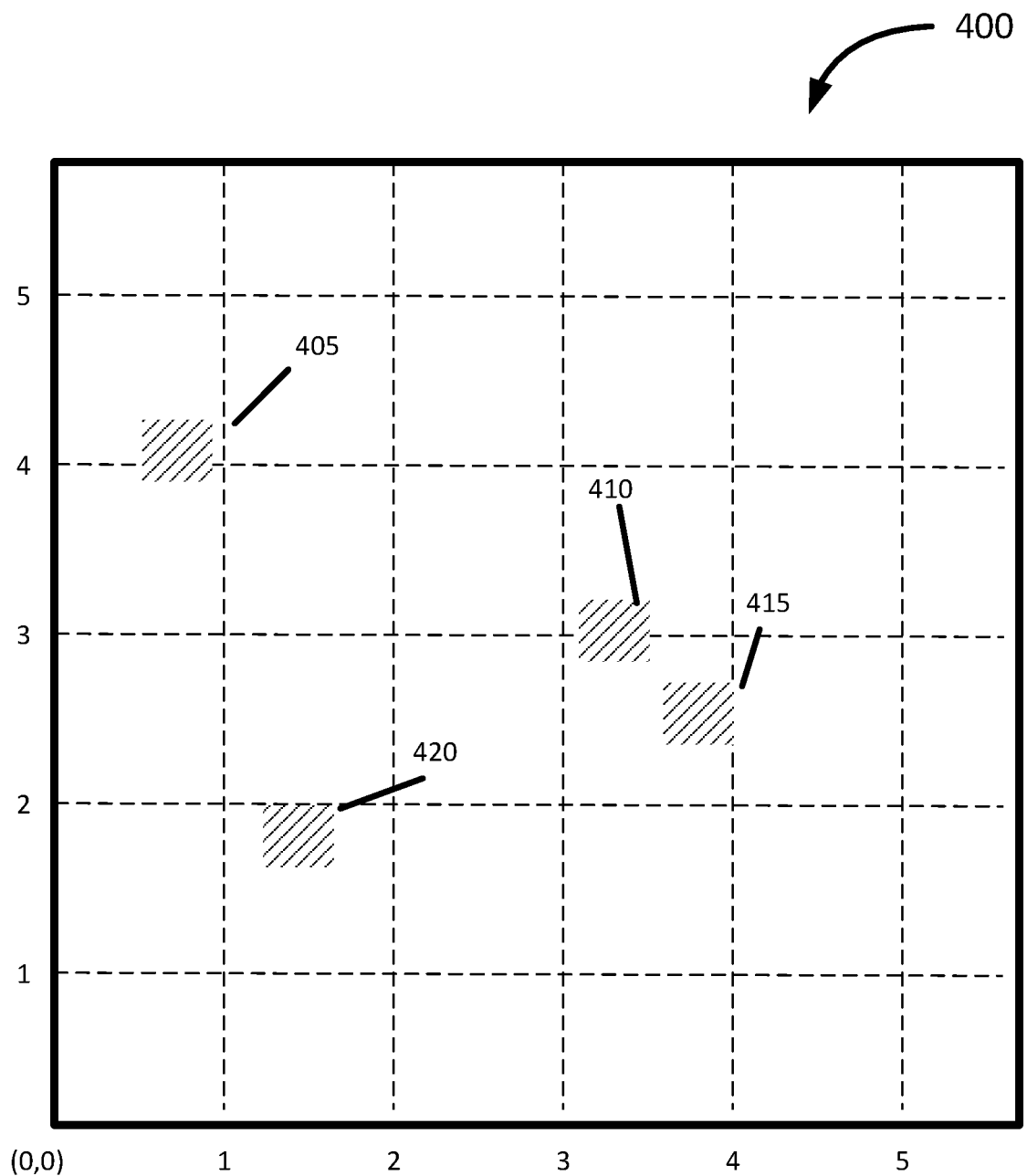
FIG. 7 is an example of another image of the document of FIG. 3.

FIG. 7 shows another raw image 400 of the same printed document as in image 300. The image 400, includes a first feature 405, a second feature 410, a third feature 415, and a fourth feature 420, which correspond to the feature 305, the feature 310, the feature 315, and the feature 320 from the image 300. The image 400 is assigned a coordinate system identical to the image 300 based on the edges of the image captured by the image capturing device. Although the image 400 is shown to be the same size as the image 300, the relative sizes (i.e. pixel counts) of the two images need not be identical.

The feature 405 appears at a position approximately (0.80,4.10) on the assigned coordinate system. The position of the feature 405 is offset from the position of the feature 305 due to the image 400 being a different image that was taken under different conditions. For example, the image capture device and the document could have been moved relative to each other.

The feature 410 appears at a position approximately (3.30,3.00) on the assigned coordinate system. The position of the feature 410 is offset from the position of the feature 310 similar to the case of the feature 405.

The feature 415 appears at a position approximately (3.85,2.50) on the assigned coordinate system. The position of the feature 415 is offset from the position of the feature 315 similar to the case of the feature 405 and the feature 410.

The feature 420 appears at a position approximately (1.45,1.80) on the assigned coordinate system. The position of the feature 420 is offset from the position of the feature 320 similar to the case of the feature 405, the feature 410, and the feature 415.

In the present example shown in FIG. 7, the feature 405, the feature 410, the feature 415, and the feature 420 from the image 400 are all offset by the same amount from their corresponding features from the image 300. Although the image 400 is a translation of the image 300, the differences between multiple images is not limited to simple translations and that other forms for transformation are contemplated.

Figure 8:
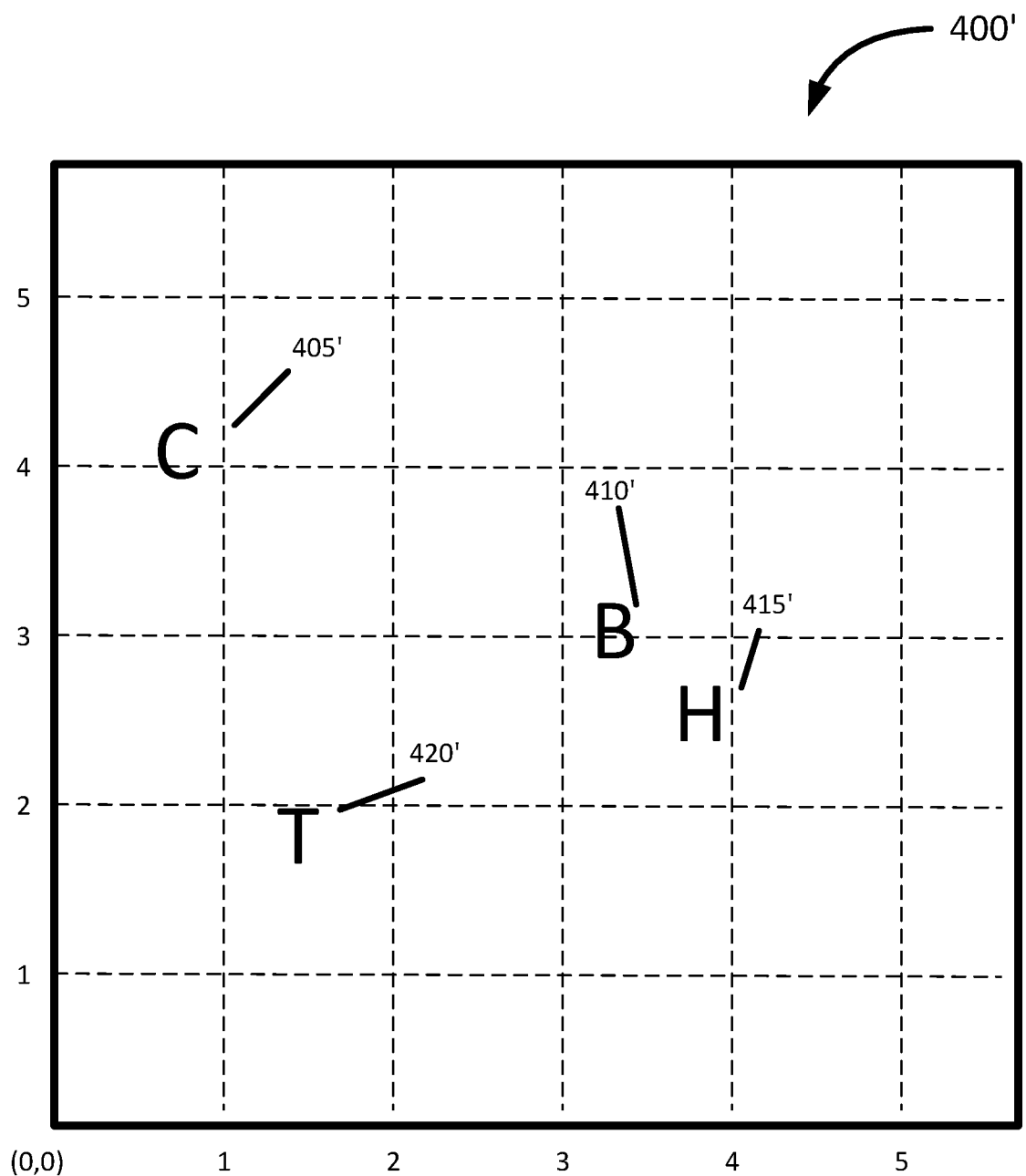
FIG. 8 is an example of the output from the OCR engine applied to the document of FIG. 5.

Continuing with the present example, FIG. 8 shows a processed image 400' of the image 400. In the present example, the image 400 was processed by the OCR engine 25 or the OCR engine 125 to generate the image 400' with embedded text where the first feature 405, the second feature 410, the third feature 415, and the fourth feature 420 were. In this example, the first feature 405 is associated with the character 405'; the second feature 410 is associated with the character 410'; the third feature 415 is associated with the character 415'; and the forth feature 420 is associated with the character 420'. The image 400' may be also assigned the same coordinate system as in the image 400.

The character 405' appears at a position approximately (0.80,4.10) on the assigned coordinate system, which is the same as the position of the original raw feature 405. In the present example, the character 405' is "C". The manner by which the character 405' was determined is not particularly limited. In the present example, OCR engine 125 applies an optical character recognition algorithm to the image 400 to determine the feature 405 is the character "C".

The character 410' appears at a position approximately (3.30,3.00) on the assigned coordinate system, which is the same as the position of the original raw feature 410. In the present example, the character 410' is determined to by the OCR engine 125 to be the character "B". In the present example, the character 410' is obtained in using the same optical character recognition algorithm as the character 405'.

The character 415' appears at a position approximately (3.85,2.50) on the assigned coordinate system, which is the same as the position of the original raw feature 415. In the present example, the character 415' is "H". The character 415' is obtained in using the same optical character recognition algorithm as the character 405' and the character 410'.

The character 420' appears at a position approximately (1.45,1.80) on the assigned coordinate system, which is the same as the position of the original raw feature 420. In the present example, the character 420' is "T". The character 420' is obtained in using the same optical character recognition algorithm as the character 305', the character 310', and the character 315'.

In the present example, the character 405', the character 410', the character 415', and the character 420' along with their positions form an output dataset associated with the image 400. The character 410' is not the same as the character 310' despite the image 300 and the image 400 are of the same document. In the present example, the character 410' was determined incorrectly by the OCR engine 125 and illustrates the fact that OCR algorithms are not perfect.

Figure 9:
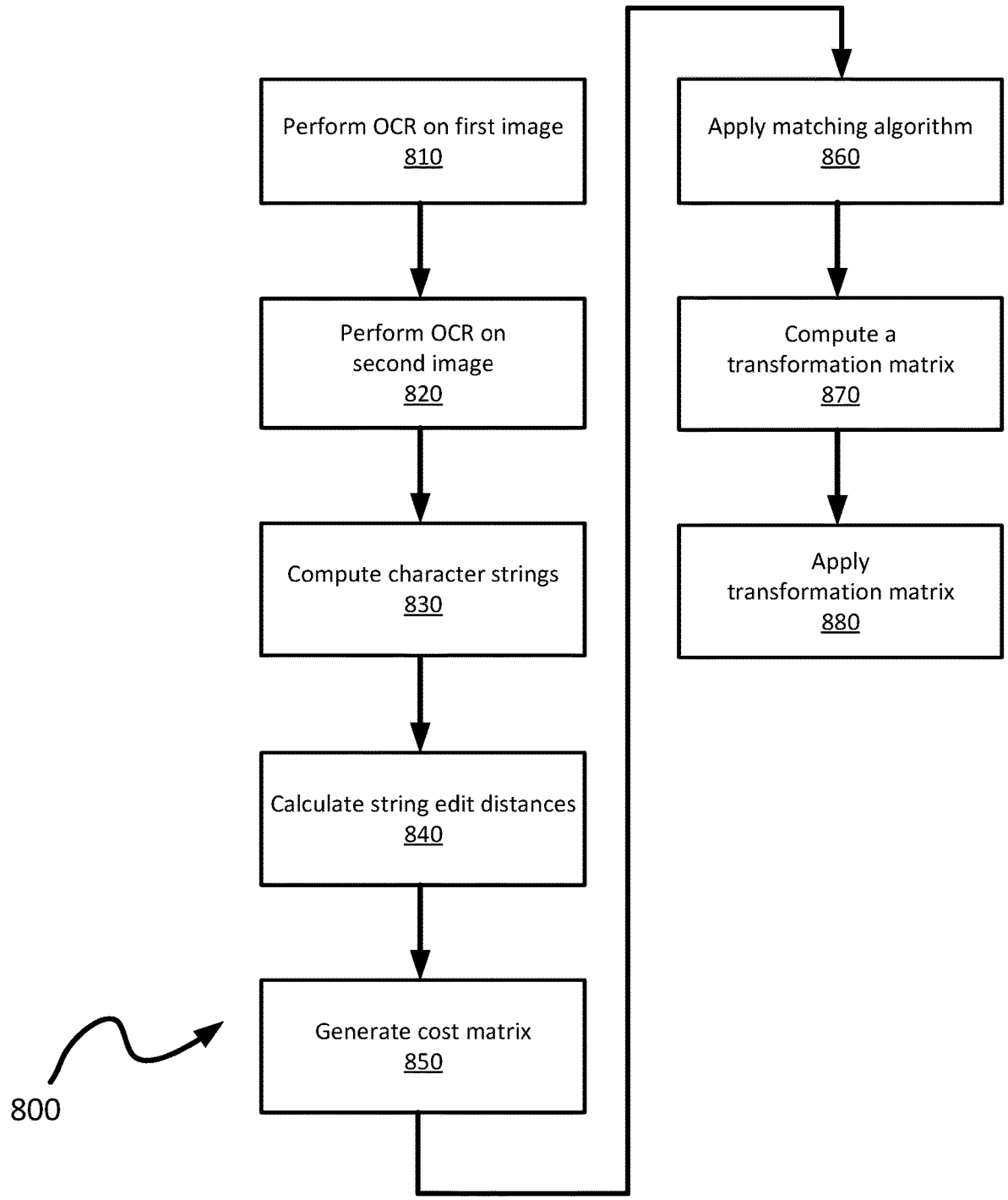
FIG. 9 is a flowchart of an example of another method.

Referring to FIG. 9, a flowchart of another method of generating a transformation matrix is shown at 800. In order to assist in the explanation of method 800, it will be assumed that method 800 is performed using the apparatus 110 on the example above illustrated in FIGS. 5 to 8, and specifically by the processor 120. Indeed, the method 800 is one way in which apparatus 110 may be configured. Furthermore, the following discussion of method 800 will lead to a further understanding of the processor 120, and apparatus 110 and its various components.

Block 810 and block 820 are similar to blocks 210, and 220, respectively from the method 200. In the present example, block 810 may be assumed to have been carried out on the image 300 and produced a first output dataset of characters. Similarly, block 820 may be assumed to have been carried out on the image 400 and produced a second output dataset of characters.

Block 830 comprises computing pluralities of text strings based on the output datasets. Continuing with the present example presented above, the output dataset of the image 300' may be used to form a plurality of strings using the characters. The manner by which the strings of characters is formed is not particularly limited. For example, the strings of characters may be formed by listing all characters in the dataset in order of distance in the image from the first letter in the string. Accordingly, the strings of characters from the image 300' may be: CATH, AHCT, HATC, and TAHC. Although all the characters in this example are used in the string, other examples can use a subset of characters limited to a predetermined number of characters. For example, the k closest characters can be used to form the text string.

Similarly, the output dataset of the image 400' may be used to form a plurality of strings using the characters. Using the same procedure as described above for the image 300', the strings of characters may be formed by listing all characters in the dataset in order of distance in the image from the first letter in the string. Accordingly, the strings of characters from the image 400' may be: CBTH, BHCT, HBTC, and TBHC.

Next, block 840 comprises the calculation of string edit distances between each possible combination of strings from the image 300 and strings from the image 400. In the present example, a string edit distance may be defined as the number of substitutions, additions, or deletions required to match a pair of strings. For example, the cost between CATH and CBTH is 1 since only the "A" needs to be changed to a "B". As another example, the cost between TAHC and HBTC is 3 since "T", "A", and "H" would need to be changed to "H", "B", and "T", respectively.

Figure 10:
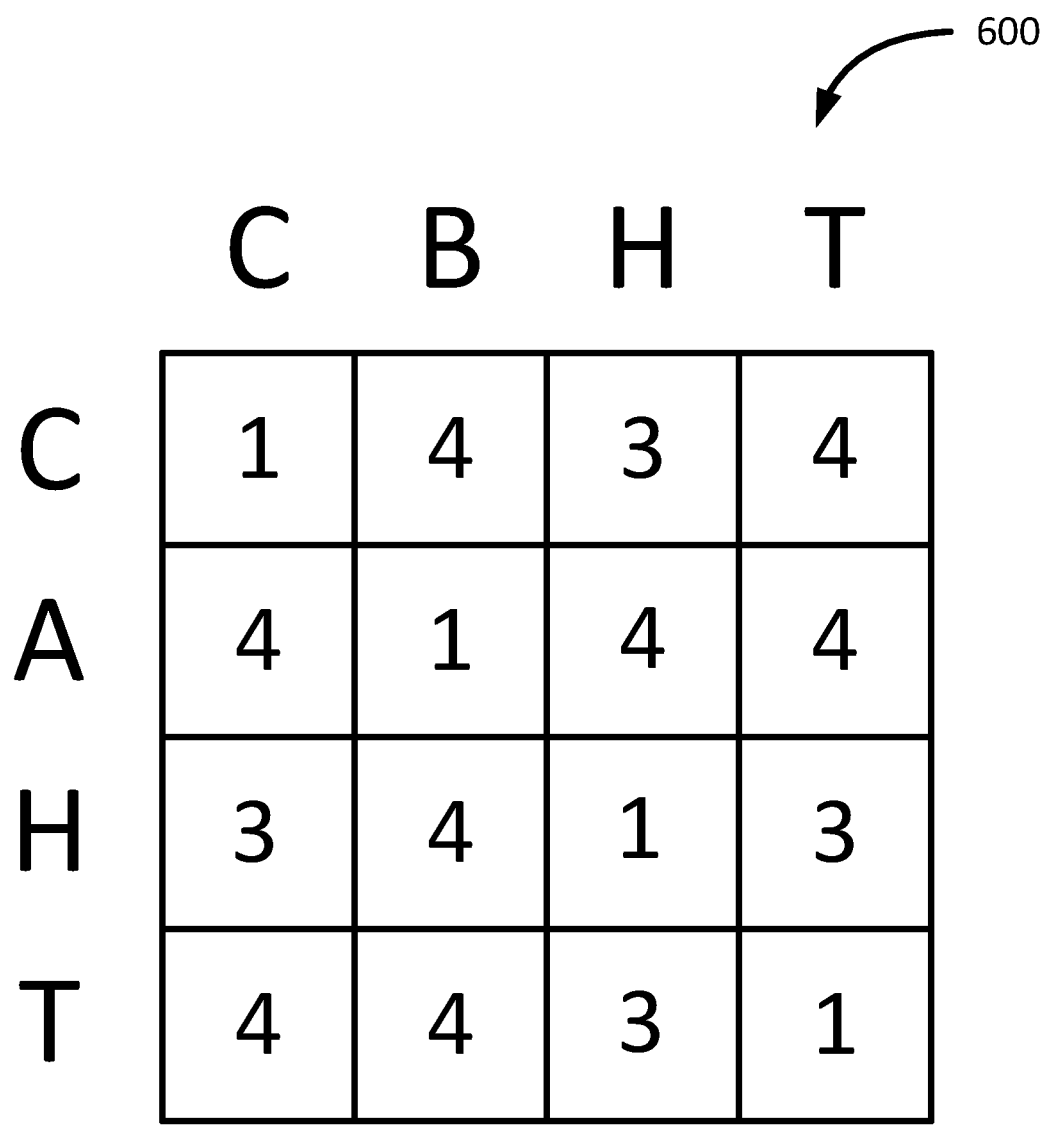
FIG. 10 is an example of a cost matrix.

Block 850 comprises the generation of a cost matrix as shown in FIG. 10 at 600. The cost matrix may be generated using the string edit distance. In the example, shown in FIG. 10, the string edit distance is used.

Block 860 comprises the application of a matching algorithm to the cost matrix to determine corresponding characters in the output datasets. Continuing with the example above, a greedy matching algorithm is applied to the cost matrix. The greedy matching algorithm eventually arrives at the lowest cost through an iterative process. In the present example, the result of the greedy matching algorithm is that the character 305', the character 310', the character 315', and the character 320' correspond with the character 405', the character 410', the character 415', and the character 420'. In making the determination, the character 310', which was defined as "A" was found to correspond to the character 410', which was determined to be "B" based on the cost matrix. This discrepancy illustrates that the method 800 may account for errors from the OCR engine 125. In other examples, a threshold for a maximum string edit distance may be applied such that if the errors are too high, the method 800 may be stopped and an error code generated since the high string edit distance may indicate that alignment is not possible.

Block 870 is similar to block 230 from the method 200. In the present example, block 870 may be assumed to compute the transformation matrix using the results the execution of block 860 to calculate the transformation of each character. Specifically, the processor 120 is used to determine the translation of points to apply to the image 400 to align it to the image 300. In this example, the transformation matrix involves application of the same translation to each point in the image 400 to align with the image 300. Although the present example deals with a simple translation, other types of transformations as discussed above are also contemplated.

Block 880 comprises the application of the transformation matrix to the image 400 to align it with the image 300. In the present example, the application results in a linear translation. However, in other examples, the transformation may involve some rotational or skewing aspects.

It should be recognized that features and aspects of the various examples provided above may be combined into further examples that also fall within the scope of the present disclosure.

What is claimed is:

1. An apparatus comprising:
   memory to store a first image of a document and a second image of the document; and
   a processor coupled to the memory, wherein the processor is to:
   perform optical character recognition on the first image to generate a first output dataset;
   perform optical character recognition on the second image to generate a second output dataset; and
   calculate, for each combination of a first string of a first plurality of strings in the first output dataset and a second string of a second plurality of strings in the second output dataset, a string edit distance between the first string and the second string of the combination, wherein the string edit distance comprises a number of substitutions, additions, or deletions to match the first string and the second string of the combination;
   generate a cost matrix from the first output dataset to the second output dataset based on the string edit distance between the first string and the second string of each combination of first strings and second strings;
   compute a transformation matrix based on the first output dataset and the second output dataset using the cost matrix, the transformation matrix to align the first image with the second image.

2. The apparatus of claim 1, wherein the processor is to determine the first plurality of strings from the first output dataset and the second plurality of strings from the second output dataset.

3. The apparatus of claim 2, wherein the first plurality of strings comprises first characters in order by distance in the first image and the second plurality of strings comprises second characters in order by distance in the second image.

4. The apparatus of claim 1, wherein the processor is to apply a greedy matching algorithm to the cost matrix to match a first character selected from the first output dataset with a second character selected from the second output dataset.

5. The apparatus of claim 1, wherein the processor is to apply the transformation matrix to the second image to align the second image with the first image.

6. A non-transitory machine-readable storage medium encoded with instructions executable by a processor, the non-transitory machine-readable storage medium comprising:
   instructions to generate a first plurality of characters from optical character recognition of a first image;
   instructions to generate a second plurality of characters from optical character recognition of a second image;
   instructions to determine a first plurality of strings from the first plurality characters and a second plurality of strings from the second plurality of characters;
   instructions to calculate for each combination of a first string from the first plurality of strings and a second string from the second plurality of strings, a string edit distance between the first string and the second string, wherein the string edit distance comprises a number of substitutions, additions, or deletions to match the first string and the second string of the combination;
   instructions to generate a cost matrix from the first plurality of characters to the second plurality of characters based on the string edit distance between the first string and the second string of each combination of first strings and second strings;
   instructions to use the cost matrix to compute a transformation matrix, the transformation matrix to align the first plurality of characters with the second plurality of characters.

7. The non-transitory machine-readable storage medium of claim 6, wherein the first plurality of strings comprises first image characters in order by distance in the image and the second plurality of strings comprises second image characters in order by distance in the image.

8. The non-transitory machine-readable storage medium of claim 6, comprising instructions to apply a greedy matching algorithm to the cost matrix to match a first character selected from the first plurality of characters with a second character selected from the second plurality of characters.

9. The non-transitory machine-readable storage medium of claim 8, comprising instructions to apply the greedy matching algorithm comprises instructions to iteratively determine a lowest cost from the cost matrix.

10. The non-transitory machine-readable storage medium of claim 6, comprising instructions to apply the transformation matrix to the second image to align the second image with the first image.

* * * * *